May 15, 1928.

C. A. MYERS

COLLAPSIBLE CORE

Filed April 19, 1923     5 Sheets-Sheet 1

Inventor
Carmon A. Myers

By A. L. Ely
Attorney

May 15, 1928.

C. A. MYERS

COLLAPSIBLE CORE

Filed April 19, 1923     5 Sheets-Sheet 2

Inventor

Carmon A. Myers

By

Attorney

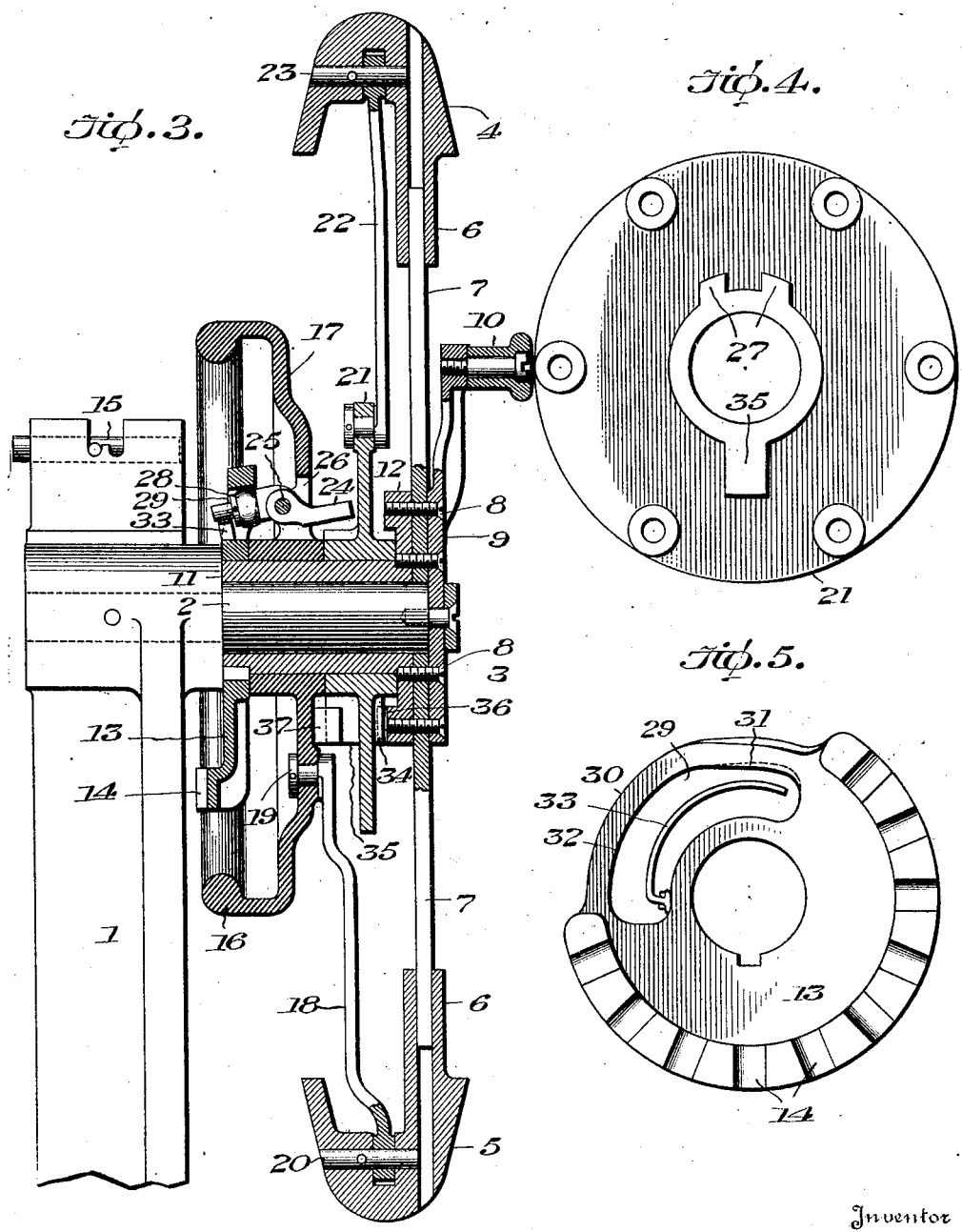

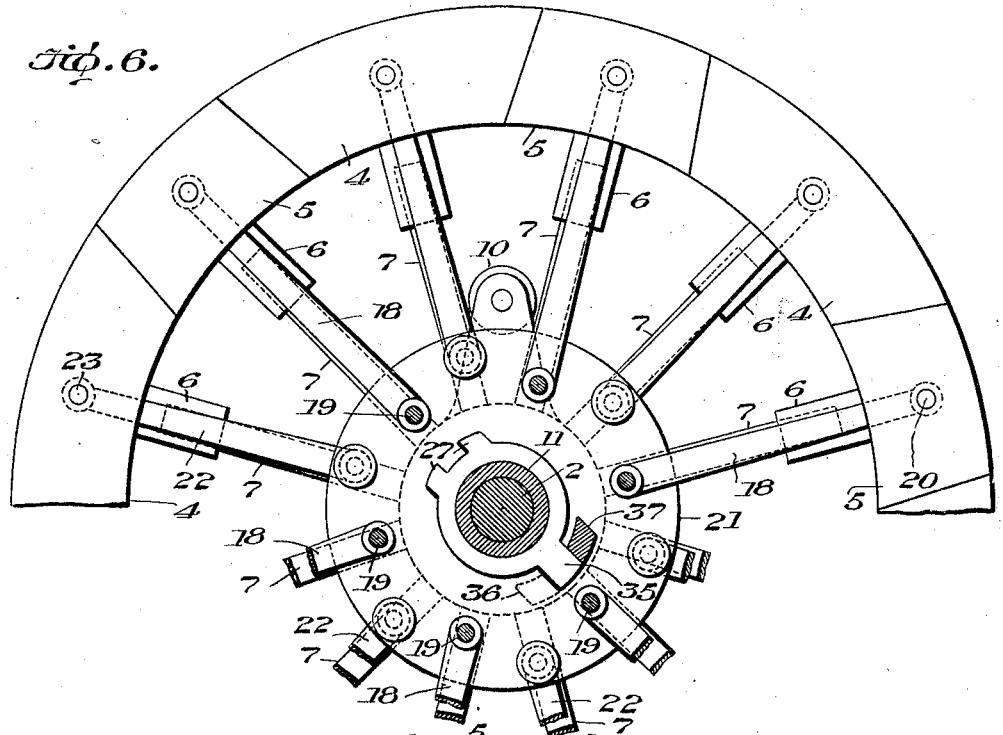
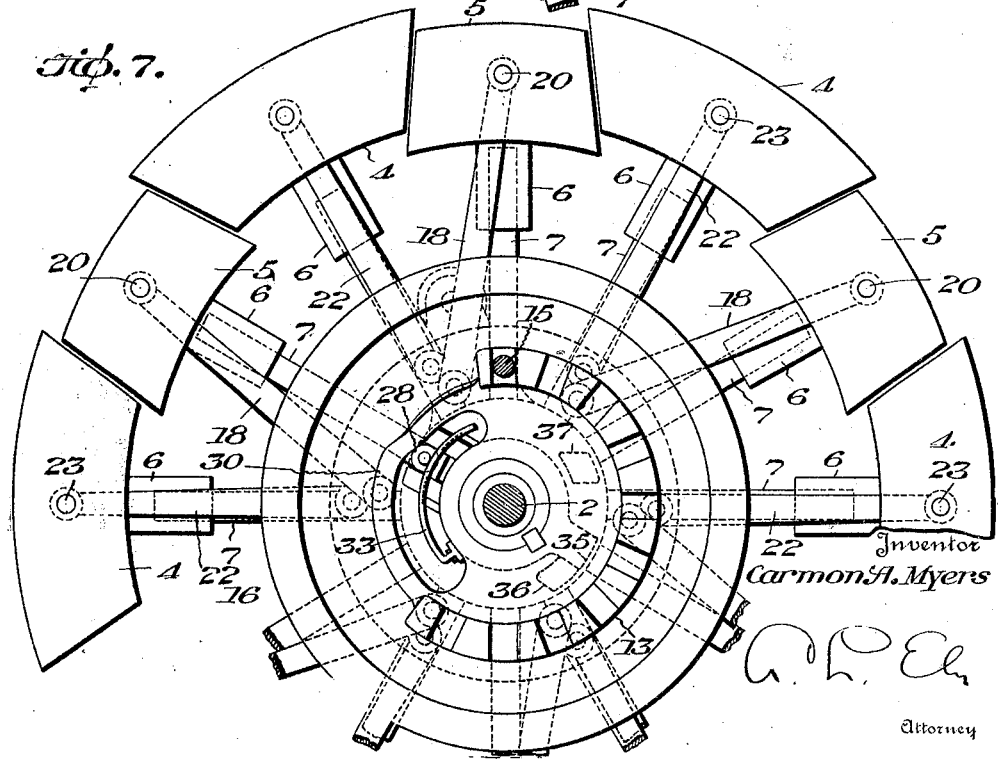

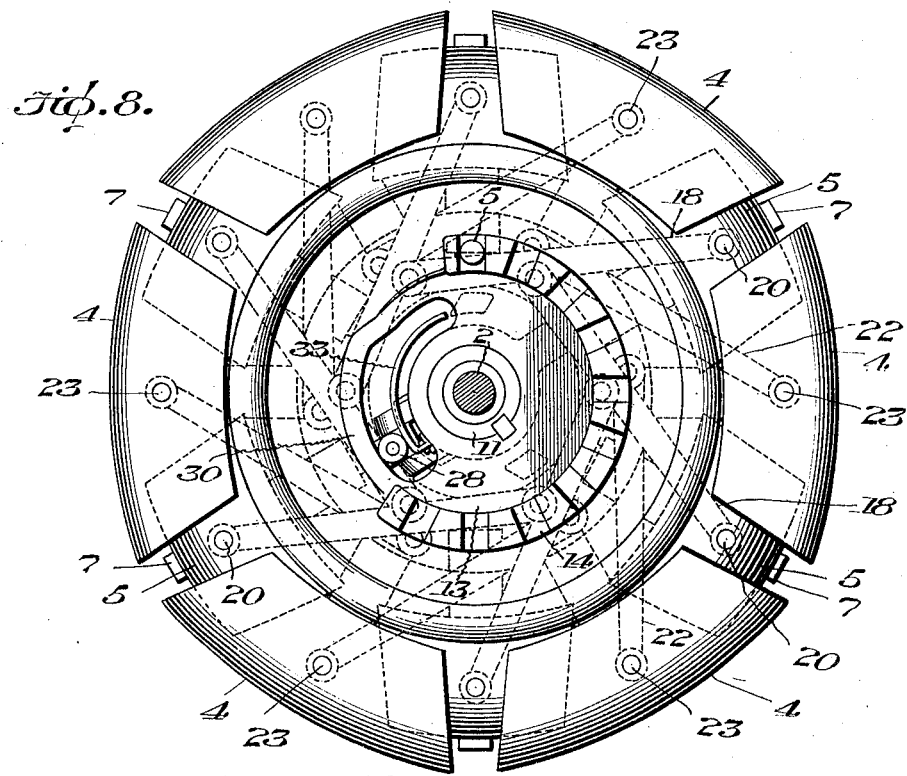
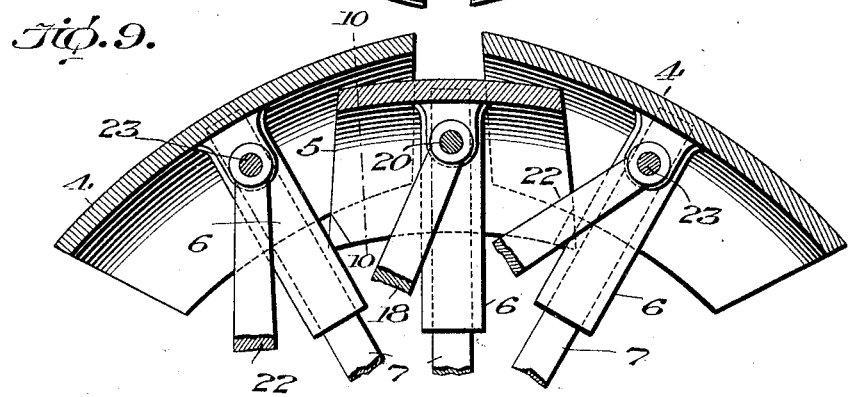
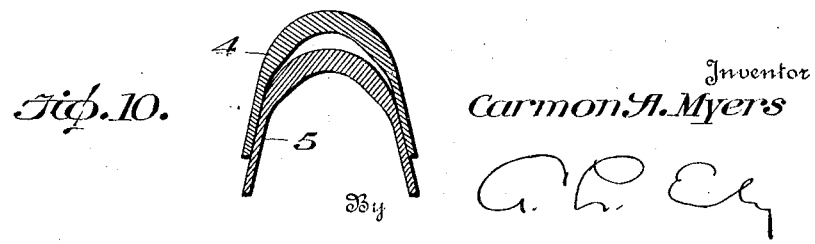

Patented May 15, 1928.

1,669,532

UNITED STATES PATENT OFFICE.

CARMON A. MYERS, OF AKRON, OHIO, ASSIGNOR TO THE FIRESTONE TIRE & RUBBER COMPANY, OF AKRON, OHIO, A CORPORATION OF OHIO.

COLLAPSIBLE CORE.

Application filed April 19, 1923. Serial No. 633,061.

My invention relates to improvements in collapsible cores for use in building pneumatic tires, being particularly adaptable for use when the finishing operations are being performed, although its use is not so restricted, as will presently be apparent.

Prior to my invention cores of this class have been open to a common objection, to wit, the sections cannot be collapsed and again set up with a minimum loss of time to the operator. This retards production, increases the cost of tire construction, and amounts to an item of considerable importance in factories where tires are produced in large numbers.

The present invention is designed to obviate the above difficulty by providing a sectional core which may be collapsed or set up in a much shorter space of time than other forms of cores now available for building tires.

Another purpose of my invention is to provide a sectional core which may be collapsed or expanded by a substantially single operation so that it may be actuated more quickly than other forms of cores, some of which require two or three distinct operations before a tire may be removed therefrom.

Still another purpose of my invention is to provide a core comprising sections which are movable in the plane of the core to expand the core annulus or to contract it to a smaller circumference than that of the bead portions of the tire so that less time is required in these operations than with those forms of cores in which some of the sections are moved laterally of others.

Other objects and advantages are also comprehended by my invention as will presently appear when the following description is read and upon reference to the accompanying drawings and the claims appended hereto.

In the drawings:

Figure 3 is a transverse sectional view, drawn on an enlarged scale, and taken on an irregular line through Figure 2;

Figure 4 is a rear elevational view of one of the actuating elements of my invention;

Figure 5 is a similar view of a cam member forming a part of my invention;

Figure 6 is a fragmentary rear elevational view showing the actuating devices of the core in a position in which they are locked against displacement;

Figure 7 is a similar view showing the core in a partially collapsed position;

Figure 8 is a rear elevational view showing the collapsed position of the core and actuating devices;

Figure 9 is a longitudinal sectional view showing the relation of the core sections in their collapsed position; and Figure 10 is a transverse sectional view taken on the line 10—10 of Figure 9.

Figure 1:
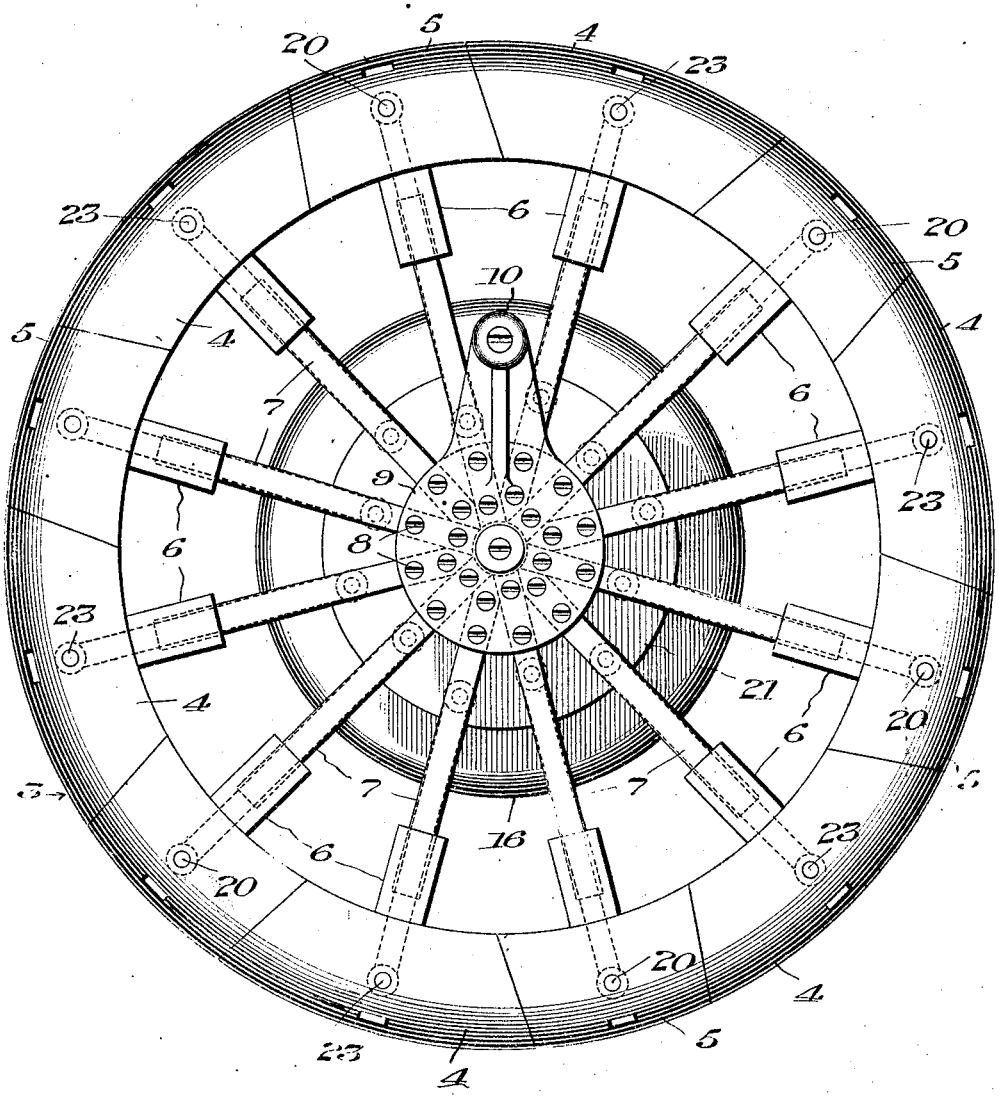
Figure 1 is a front elevational view of a core constructed in accordance with my invention, showing the sections set up in their expanded position.
Figure 2:
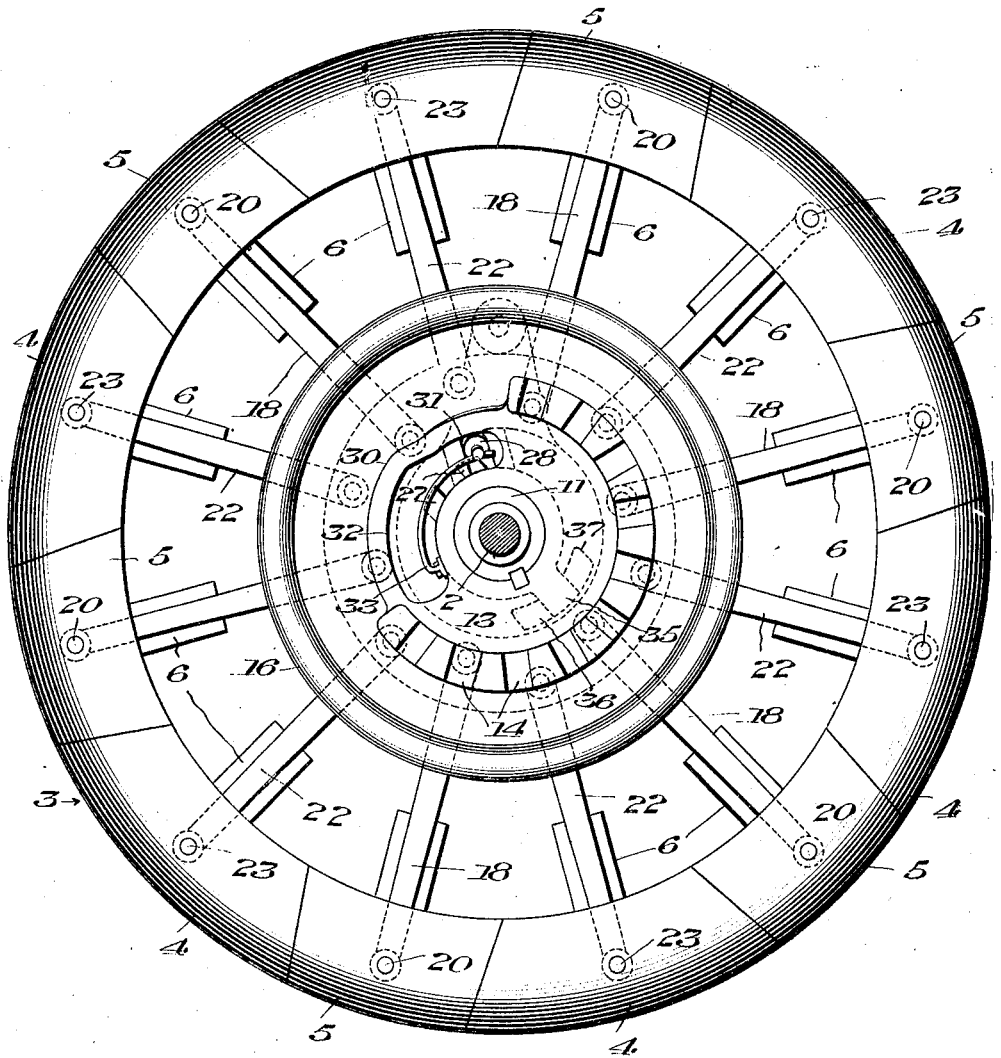
Figure 2 is a rear elevational view.

Referring to the drawings, the numeral 1 designates a core stand of any suitable construction having a horizontal shaft 2 mounted thereon which supports my improved core designated generally by the numeral 3.

The core 3 comprises an even number, preferably six, of arcuate major sections 4 and a similar number of key sections 5 adapted to be positioned between the ends of the major sections to form therewith a continuous annulus concentric to the shaft 2. Sections 4 and 5 are constructed in the form of shells, somewhat U-shaped in cross-section, and are open at their ends so that the key sections 5 are adapted to rest within the ends of the major sections 4 and the major sections telescope over the key sections when the core is being collapsed. These sections are preferably formed by cutting an annulus of the proper cross-sectional contour in planes at an angle to the radii of the annulus so that ends of the key sections 5 converge toward the outer periphery of the annulus and the ends of the sections 4 are reversely formed. Thus the key sections are adapted to wedge outwardly between the major sections and mate therewith in end to end position to form an unbroken annulus. The sections 4 and 5 are provided with sleeves 6 projecting toward the shaft 2 and offset from the central plane of the sections for a purpose presently apparent. Each section 4 and 5 is mounted to slide upon the forward end of an individual arm 7 that projects radially from the outer end of the shaft 1. The inner ends of the arms 7 are suitably bolted, as at 8, to a cap plate 9 that is mounted to rotate upon the forward end of the shaft 2. A sleeve 11 having a flange 12 at its forward end is secured to the arms 7, by the bolts 8, to rotate therewith when the cap plate is rotated. The arms 7, sections 4 and 5, and sleeve 11 are rotated about the shaft 2 by means of a crank 10 that is carried by the cap plate 9. At its rear end the sleeve carries a concentrically mounted cam member 13 which is provided on its rear face with a series of notches 14 with which a suitably arranged locking pin 15 upon the stand 1 may be engaged to lock the core parts previously described against rotation The sleeve 11 carries a hand wheel 16 mounted to rotate freely thereon in front of the cam member 13 and comprising a web portion 17. The hand wheel 16 is directly connected to the key sections 5 by a series of links or arms 18, the inner ends of which are pivoted to the web 17 as by bolts 19 to be swung concentrically of the shaft 2 when the wheel 16 is moved. At their outer ends each link 18 is pivoted to one of the key sections 5 by a pin 20 that extends transversely of the section. A disc 21 is mounted to rotate upon the sleeve 11 intermediate the wheel 16 and the flange 12 and is connected to the major sections 4 by links or arms 22. The links 22 are each pivoted at their outer ends to one of the sections 4 by transversely extending pins 23. At their inner ends the links 22 are pivoted to the disc 21, as at 23ª, to also rotate concentrically about the shaft 2. The wheel 16 carries a dog or latch 24 that is pivoted, as at 25, upon the web 17. One end of the dog 24 projects laterally of the web through an opening 26 therein toward the disc 21 to engage between two lugs 27 upon the disc and rotate the disc together with the wheel 16. In the expanded position of the core, the dog is raised from engagement with the lugs 27 by means of a roller 28 upon its opposite end that is disposed in a slot 29 in the member 13 and against a cam 30. Cam 30 comprises a low face 31 and a high face 32 with which the roller is normally engaged by an arcuate leaf spring 33 that is carried upon the member 13 and bears against the end of the dog 24. The disc 21 is provided upon its front and rear faces respectively with oppositely disposed lugs 34 and 35, and the sleeve flange 12 and hand wheel 16 are also provided with stop lugs 36 and 37 respectively, the function of which will presently be set forth.

In the expanded position of my core the hand wheel 16 and disc 21 are so positioned relative to the arms 7 that the pivoted inner ends of the links 18 and 22 are slightly past a dead center position as shown in Figure 6, in which position lugs 34 and 35 upon the disc 21 bear respectively against lug 36 upon the sleeve flange 12, and lug 37 of the hand wheel 16 bears against lug 36. The core parts are now locked together to be rotated as a unit upon the shaft 2, and the disc 21 and wheel 16 are locked against rotation in one direction relative to the arms 7 and sleeve 11.

To collapse the core it is rotated as a unit until the pin 15 may be engaged with one of the notches 14 upon the cam member 13 whereupon the member 13, sleeve 11, arms 7 and sections 4 and 5 are held against further rotation upon the shaft 2. The hand wheel 16 is now given a slight turn approximately 30 degrees away from the lug 35 of the disc 21. This operation unlocks the key sections 5 and moves them inwardly a sufficient distance to permit the major sections 4 to telescope over them, and moves the dog 24 so that the roller 28 leaves the low face 31 of the cam 30 and engages the high face 32 thereof. The dog 24 is thus forced between the lugs 27 of the disc 21 by the spring 33. Upon further rotation of the hand wheel 16 the disc 21 will be rotated to unlock the major sections 4 and move them inwardly together with the key sections 5. The key sections, however, move faster than the major sections until the sections approach their fully collapsed position. This is due to the fact that the inner ends of the links 18 have been initially moved further from a dead center position than the inner ends of the links 22. The links 22 are, however, shorter than links 18 and their inner ends are pivoted further from the axis of the shaft 2. Hence their throw is greater than the inner ends of the levers 18 so that as the sections 4 and 5 approach their fully collapsed position the major sections 4 will move faster and telescope or move into a position underlying the key sections to form a compact unitary structure of relatively small circumference. During this operation roller 28 reaches the end of the slot 29, whereupon further movement of the core parts is prevented so that the major sections will not bind upon the key sections.

It will be noted that the entire collapsing operation has been accomplished by a partial turning of the wheel 16 in one direction and that the core sections are maintained in the plane of the core at all times.

The operation of expanding the core will be clear, it is believed, from the foregoing and need not be described in detail herein.

The foregoing description constitutes a detailed disclosure of one form of my invention, but it is not to be construed in a limiting sense as changes and modifications may be resorted to without departing from the spirit of the invention or the scope of the appended claims.

What I claim is:

1. A collapsible annular core comprising, bodily movable sections adapted to telescope in the collapsed position of the core, and means for moving the sections into collapsed position.

2. A collapsible annular core comprising, bodily movable sections adapted to telescope in the collapsed position of the core, and means operable to lock the sections against movement and to move them into collapsed position.

3. A collapsible annular core comprising, telescopic sections adapted bodily to move in the plane of the core into collapsed position, and means for moving the sections.

4. A collapsible annular core comprising, telescopic sections adapted bodily to move radially of the core into collapsed position, and means for moving the sections.

5. A collapsible annular core comprising, telescopic sections adapted bodily to be moved radially in the plane of the core, and means for moving the sections.

6. A collapsible core comprising, movable sections adapted to mate into annular form and to telescope in the collapsed position of the core, a shaft for the core, and means rotating about the shaft for moving the sections and also locking them against movement toward collapsed position.

7. A collapsible core comprising, bodily movable sections adapted to mate into annular form and to telescope in the collapsed position of the core, and means for simultaneously moving the sections to collapsed position arranged to initially move some of the sections with respect to others.

8. A continuous annular core comprising, a series of radially movable key sections, radially movable sections intermediate the key sections said sections being adapted to telescope as the core is collapsed, and means for simultaneously moving the sections to collapsed position arranged to initially move the key sections relative to the intermediate sections.

9. A continuous annular core comprising, a series of key sections, a series of sections intermediate the first sections said sections being adapted to move in a common plane to collapse the core, an axial shaft for the core, rotatable arms on the shaft for guiding movement of the sections, individual rotary devices for moving each series of sections, and means for locking the devices to rotate together when one series has been moved to partially collapsed position.

10. A continuous annular core comprising, a series of movable key sections, a series of movable sections intermediate the first sections, a stationary shaft, rotatable arms on the shaft for guiding movement of the sections, individual rotary devices on the shaft for moving each series of sections, devices for locking the arms against rotation, and means for locking the devices to rotate together when one series has been moved to partially collapsed position.

11. A continuous annular core comprising, a series of movable key sections, a series of movable sections intermediate the first sections, a stationary shaft, rotatable arms on the shaft for guiding movement of the sections, devices for locking the arms against rotation, individual devices for moving each series mounted to rotate about the shaft, means for limiting rotation of the devices in one direction relative to the arms, and means for locking the devices together when one series has been moved to partially collapsed position.

12. A continuous annular core comprising, a series of movable key sections, a series of movable sections intermediate the key sections, a stationary shaft, rotatable arms on the shaft for guiding movement of the sections, devices for locking the arms against rotation, individual devices for moving each series mounted to rotate about the shaft, means for limiting rotation of the devices in one direction relative to the arms, means for limiting relative rotation of the devices in one direction, and means for locking the devices together when one series has been moved to partially collapsed position.

13. A continuous annular core comprising, a series of movable key sections, a series of movable sections intermediate the key sections, a stationary shaft, rotatable arms upon the shaft for guiding movement of the sections, a member arranged to rotate about the shaft, links connecting the member with the intermediate sections, a second member rotatable about the shaft, links connecting the second member to the key sections, devices for limiting rotation of the members in one direction relative to the arms to lock the links in a dead center position, and devices for locking the members together through rotation of one of said members.

14. A continuous annular core comprising, a series of movable key sections, a series of movable sections intermediate the key sections, rotatable arms for guiding movement of the sections, a member rotatable about the core axis, pivoted levers connecting the member to some of the sections, a second member also rotatable about the core axis, pivoted levers connecting the second member with other sections, devices for locking the arms against rotation, devices for limiting rotation of the members in one direction relative to the arms, and means for locking the members together through rotation of one of said members.

CARMON A. MYERS.